United States Patent
Robert et al.

(10) Patent No.: US 11,629,980 B2
(45) Date of Patent: Apr. 18, 2023

(54) METHOD FOR COATING A SENSOR UNIT, AND ASSOCIATED SENSOR UNIT

(71) Applicant: Aktiebolaget SKF, Gothenburg (SE)

(72) Inventors: Eric Robert, Saint Cyr sur Loire (FR); Alexandre Taillepied, Fondettes (FR); Benedicte Thomas, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/009,922

(22) Filed: Sep. 2, 2020

(65) Prior Publication Data

US 2021/0088364 A1 Mar. 25, 2021

(30) Foreign Application Priority Data

Sep. 23, 2019 (DE) .................... 102019214417.9

(51) Int. Cl.
| | | |
|---|---|---|
| *G01D 21/00* | (2006.01) | |
| *B05D 1/18* | (2006.01) | |
| *B05D 3/02* | (2006.01) | |
| *B05D 1/28* | (2006.01) | |
| *B05D 1/02* | (2006.01) | |

(52) U.S. Cl.
CPC ............. *G01D 21/00* (2013.01); *B05D 1/02* (2013.01); *B05D 1/18* (2013.01); *B05D 1/28* (2013.01); *B05D 3/0254* (2013.01)

(58) Field of Classification Search
CPC . G01D 21/00; B05D 1/02; B05D 1/18; B05D 1/28
See application file for complete search history.

(56) References Cited

U.S. PATENT DOCUMENTS

| | | | | |
|---|---|---|---|---|
| 4,610,942 A | * | 9/1986 | Yashiki | G03G 5/0525 430/132 |
| 2008/0132653 A1 | * | 6/2008 | Shiono | C09D 171/02 525/478 |
| 2013/0333675 A1 | * | 12/2013 | Seaton | G01K 1/10 123/568.12 |
| 2017/0343423 A1 | * | 11/2017 | Krzywosz | H01C 7/04 |

OTHER PUBLICATIONS

SCC3, DCA, DCA, Modified Alkyd Conformal Coating (SCC3), Conformal Coatings: Technical Data Sheet, Electrolube: The Solutions People, 5.

* cited by examiner

*Primary Examiner* — Nathan T Leong
(74) *Attorney, Agent, or Firm* — Garcia-Zamor Intellectual Property Law, LLC; Ruy Garcia-Zamor

(57) ABSTRACT

A method for coating a sensor unit providing at least one sensor element and a sensor body supporting the sensor element. The method includes applying, in the assembled state of the sensor unit, a coating on the exterior surface of the sensor unit such as to coat the sensor element and the sensor body.

11 Claims, 3 Drawing Sheets

METHOD FOR COATING A SENSOR UNIT, AND ASSOCIATED SENSOR UNIT

CROSS-REFERENCE TO RELATED APPLICATIONS

This application claims priority to German Patent Application no. 102019214417.9, filed Sep. 23, 2019, the contents of which is fully incorporated herein by reference.

TECHNICAL FIELD OF THE INVENTION

The present invention relates to the field of sensor units for sensing the angular position of a rotatable element with respect to a fixed element, and notably to the field of sensor bearing units comprising a bearing and such a sensor unit. More precisely, the present invention relates to a method for coating a sensor unit.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

A sensor bearing unit comprises a bearing and a sensor unit for sensing the angular position of the rotatable ring of the bearing with respect to the fixed ring. Such sensor unit is generally provided with an impulse ring secured to the rotatable ring and including alternating North and South poles, and with a sensor element facing the impulse in order to determine, on the basis of the magnetic field variations, the angular position of the rotatable ring.

The sensor unit is also provided with a sensor body supporting the sensor element and secured to the fixed ring of the bearing, and with an output connecting cable adapted to transmit sensing data to a reception device.

Classically, the sensor body of the sensor unit is overmoulded on the sensor element. Only an active part of the sensor element, which faces the impulse ring, is not embedded into the sensor body.

After the shrinkage of the moulded plastic, some narrow passages may be formed between the sensor element and the sensor body. Water and/or contaminating particles may reach the sensor element.

One aim of the present invention is to overcome this drawback.

SUMMARY OF THE INVENTION

It is a particular object of the present invention to provide a sensor unit having improved resistance to humidity and contaminating particles.

The invention relates to a method for coating a sensor unit comprising at least one sensor element and a sensor body supporting the sensor element.

The method comprises the step of applying, in the assembled state of the sensor unit, a coating on the exterior surface of the sensor unit such as to coat the sensor element and the sensor body.

The expression "exterior surface of the sensor unit" is intended to mean the surface of the sensor unit which is accessible from the outside in the assembled state of the sensor unit.

Thanks to the invention, narrow passages that may be formed between the sensor element and the sensor body are covered by the applied coating layer.

This improves the sealing of sensor unit against humidity, immersion in water with aggressive chemical agent such as salt, solvent, mineral grease etc . . . .

Besides, the coating layer applied on sensor unit can also provide an improved resistance against electrostatic discharges.

Otherwise, the sensor unit can be produced and assembled with the conventional process steps, as the coating operation is performed when the sensor unit is already assembled, without any adaption.

In one embodiment, the method comprises, after the coating step, at least a first curing step wherein the coating is cured at room temperature and at a relative humidity lower or equal to 80%.

Advantageously, the method further, after the first curing step, a second curing step wherein the coating is cured at a higher temperature and at a relative humidity lower or equal to 80%.

Preferably, the coating is applied in a dipping process. Alternatively, the coating may be applied by spraying or brushing.

However, with the dipping process, the coating recovers all asperities notably located on the sensor element and/or between the sensor element and the sensor body, compared to spraying or brushing which may not reach all surfaces of the sensor unit. Besides, with the dipping process, the thickness of the coating is regular and the air inclusions are limited.

With the dipping process, the coating step may comprise the operation of moving downward the sensor unit vertically into a bath of coating until the sensor element and the sensor body are coated.

The coating step may further comprise, after the operation of moving downward the sensor unit, the successive operations of:

moving upward the sensor unit until the sensor element is in the air at a first speed, and withdrawing completely the sensor unit from the bath at higher second speed.

In one embodiment, the coating step further comprises, after withdrawing, the operation of letting drain the residual coating of the sensor unit over the bath.

In one embodiment, the sensor unit further comprises an output cable mounted inside the sensor body and extending outwards.

In this case, the method may advantageously comprise the step of applying, in the assembled state of the sensor unit, a coating on the exterior surface of the sensor unit such as to coat the sensor element, the sensor body and at least the portion of the output cable protruding outwards with regard to the sensor body.

Narrow passages that may be created between the output cable and the sensor body are also sealed by this coating layer. The sealing of sensor unit is further enhanced.

In one particular embodiment, during the coating step, the coating is also applied on a printed circuit board provided along the output cable or provided into a connector of the output cable.

The coating may partially recover the output cable. In this case, the coating recovers at least the protruding portion of the output cable adjacent to the sensor body. Alternatively, the coating may recover the entire length of the output cable.

The invention also relates to a sensor unit comprising at least one sensor element and a sensor body supporting the sensor element.

According to a general feature, the sensor unit further comprises a coating layer covering the exterior surface of the sensor element and sensor body.

Preferably, the whole exterior surface of the sensor body and the whole exterior surface of the sensor element are covered by the coating.

The sensor unit may also comprise a support inside which is at least partly housed the sensor body. The exterior surface of the casing is covered by the coating.

Preferably, the coating is a single-layer coating. Alternatively, the coating may be a multi-layer coating.

In one embodiment, the sensor unit further comprises an output cable mounted inside the sensor body and extending outwards. In this case, the coating layer may also cover at least the portion of the output cable protruding outwards with regard to the sensor body.

In one embodiment, the sensor unit may be deprived of such output cable in case of a wireless sensor element.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION OF SOME EMBODIMENTS

Figure 1:
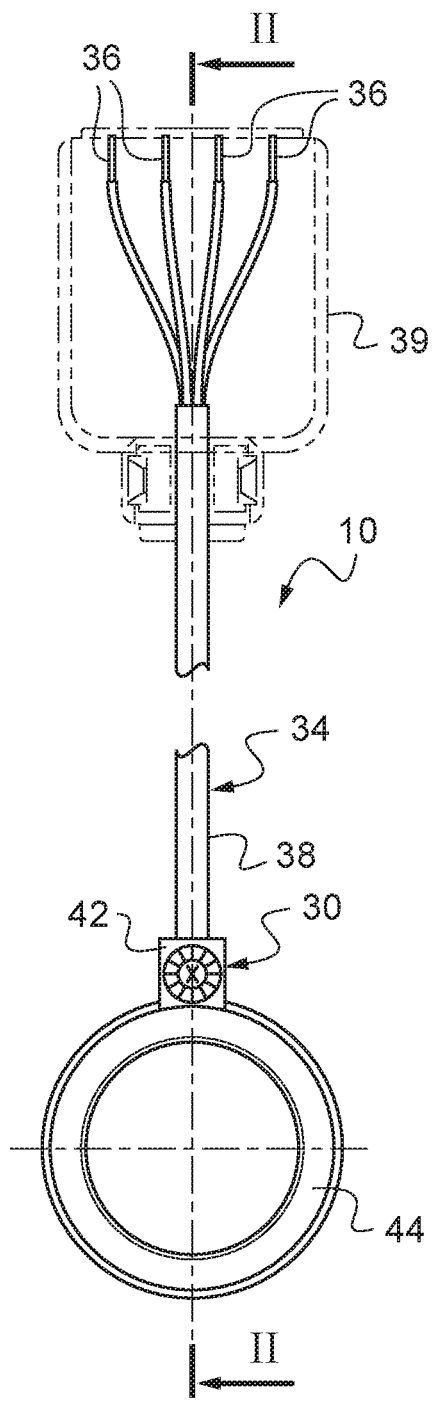
FIG. 1 is a front view of a sensor unit according to a first example of the invention.
Figure 2:
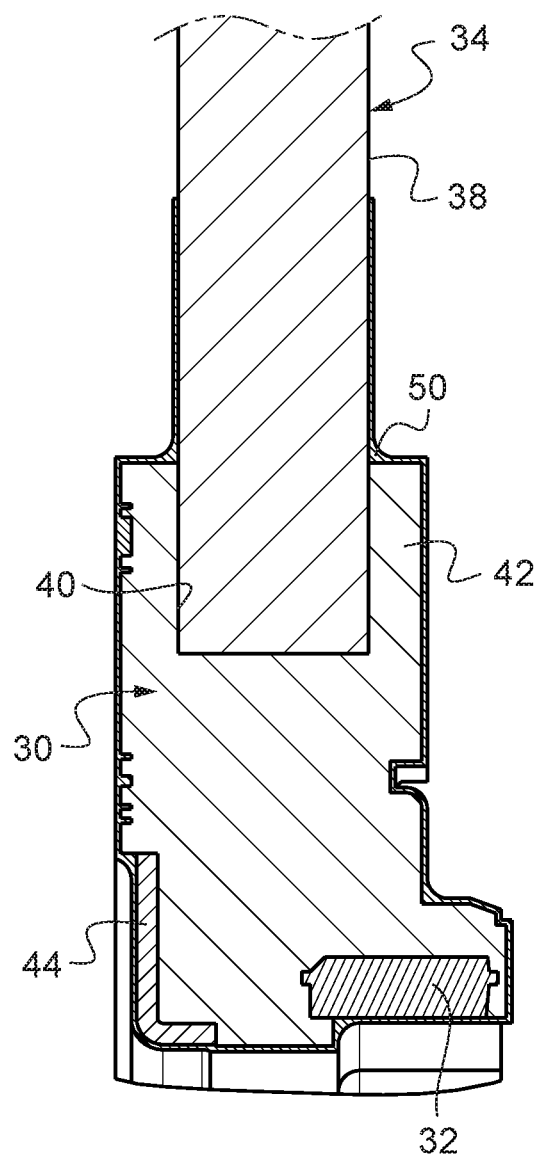
FIG. 2 is a partial section on II-II of FIG. 1.
Figure 3:
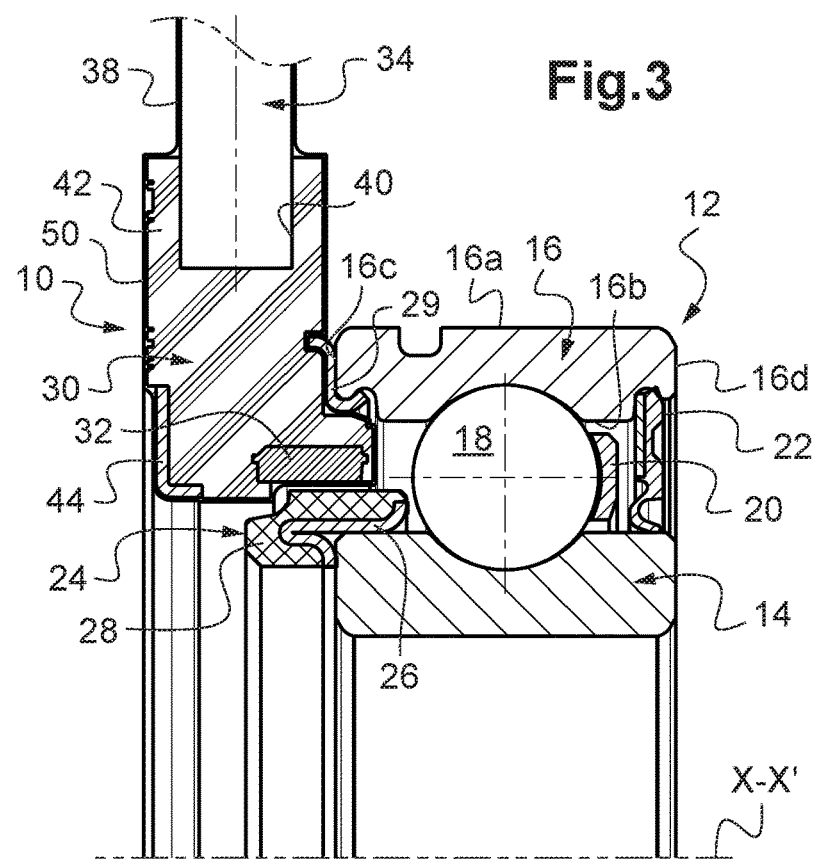
FIG. 3 is a partial section of a sensor bearing unit comprising the sensor unit of FIGS. 1 and 2.

The sensor unit 10 represented on FIGS. 1 and 2 is adapted to equip a bearing 12 shown on FIG. 3 to form a sensor bearing unit.

As will be described later, the sensor unit 10 is coated with a coating, preferably with a conformal coating.

The bearing 12 comprises an inner ring 14 and an outer ring 16. The inner and outer rings 14, 16 are concentric and extend axially along the bearing rotation axis X-X' which runs in an axial direction.

The bearing 12 also comprises a row of rolling elements 18, which are provided here in the form of balls, interposed between the inner and outer rings 14, 16. The rolling bearing 12 also comprises a cage 20 for maintaining the regular circumferential spacing of the rolling elements 18. In the disclosed embodiment, the bearing 12 further comprises on one side an annular seal 22 to close the radial space that exists between the inner and outer rings 14, 16.

The inner ring 14 of the bearing is intended to be mounted on a shaft of an apparatus for tracking the rotation of the shaft. The inner ring 14 is intended to rotate while the outer ring 18 is intended to be fixed. The outer ring 16 can be mounted in a fixed support member or housing, belonging to the apparatus.

The outer ring 16 comprises an outer cylindrical surface 16a and a cylindrical inner surface or bore 16b from which a toroidal circular raceway (not referenced) for the rolling elements 18 is formed, the raceway being directed radially inwards. The outer ring 16 further comprises two opposite radial lateral faces 16c, 16d which axially delimit the outer surface 16a and the bore 16b of the ring.

The outer ring further comprises two grooves (not referenced) formed radially towards the outside from the bore 16b and arranged laterally to the raceway. The seal 22 is mounted into one of the grooves.

The bearing 12 is also equipped with an encoder unit 24 secured to the inner ring 14 of the bearing and adapted to cooperate with the sensor unit 10.

The encoder unit 24 comprises an annular target holder 26 mounted on the inner ring 16, and a magnetic target 28 mounted on the target holder. The target holder 26 is secured onto the outer surface of the inner ring 14 axially on the side opposite to the seal 22 with respect to the row of rolling elements 18. The target holder 26 is secured onto the inner ring 14 to fasten in rotation the encoder unit 24 with this rotatable inner ring. The target holder 26 is made in one part. The target holder 26 may be made of metal or plastic, formed by stamping or by any other suitable process.

The target 28 is mounted on the exterior surface of the target holder 26. The target 28 is a plastic molded part including magnetic alternating North and South alternated poles.

The bearing 12 is also equipped with an annular cap 29 in order to secure the sensor unit 10 to the outer ring 16. The cap 29 is secured to the outer ring 16. More precisely, the cap 29 is secured into the groove of the outer ring 16 axially located near to the lateral surface 16c. The cap 29 is also fixed to the sensor unit 10. The cap 29 is an annular shaped part centred on the bearing rotation axis X-X'. The cap 29 is made of metal.

The sensor unit 10 comprises a sensor body 30, a sensor element 32 supported by the sensor body, and an output connecting cable 34 for transmitting sensing data.

The sensor body 30 is made of a synthetic material, for example such as PA 6.6. In the disclosed embodiment, the sensor body 30 is overmoulded on the sensor element 32. Alternatively, the sensor element 32 may be secured on the sensor body 30 by any appropriate means, for example by gluing. The sensor body 30 is secured to the outer ring 16 of the bearing. The sensor body 30 is secured to the cap 29. The sensor body 30 projects radially outwards with respect to the outer ring 16.

The sensor element 32 is mounted semi-embedded inside the sensor body 30 and flush with an annular inner surface of the sensor body. The sensor element 32 radially faces the target 28 of the encoder unit. A slight radial gap is provided between the sensor element 32 and the target 28. In an alternative embodiment, the sensor element 32 may axially face the target 28 of the encoder unit. The sensor element 32 is adapted to detect magnetic field variations generated by the rotation of the encoder unit 24. The sensor element 32 may be a Hall-effect sensor.

The output cable 34 extends outwards relative to the sensor body 30. In the disclosed example, the output cable 34 extends radially outwards. Alternatively, the output cable 34 may extend axially outwards.

As shown on FIG. 1, the output cable 34 comprises several electrical wires 36, and an insulating sheath 38 inside which are maintained together the wires 36. The wires 36 of the output cable are directly connected to the sensor element 32 (not shown). Alternatively, the sensor unit may comprise a printed circuit board to which the sensing element is connected. In this case, the electrical wires 36 of the output cable may be connected to the printed circuit board.

In the disclosed example, the output cable 34 also comprises, at a free portion, a plug connector 39 (represented in dotted lines) within are located the free ends of the wires 36. Alternatively, the output cable 34 may be deprived of such connector.

Referring once again to FIGS. 2 and 3, the output cable 34 is mounted inside the sensor body 34 and extends outwards. An end of the output cable 34 is inserted into an opening 40 made in the sensor body 34. The output cable is secured into the opening 40. The output cable 34 may be secured into the opening 40 by any appropriate means, for example press-fitting, gluing, overmoulding the sensor body 34, etc.

The sensor body 34 is also provided with an outlet protruding portion 42 extending radially outwards from the outer surface of the sensor body. The opening 40 is made on the outlet protruding portion 42 of the sensor body. The sensor body 34 and the outlet protruding portion 42 are made in one part. In the disclosed example, the outlet protruding portion 42 has a rectangular parallelepiped form. Alternatively, the outlet protruding portion 42 may have other shapes, for example a tubular form.

In the disclosed example, the sensor unit 10 further comprises a support 44 axially mounted on the sensor body 30 on the side opposite to the bearing 12. The support 44 is fixed to the sensor body 30. The support 44 is an annular shaped part centred on the bearing rotation axis X-X'. The sensor body 30 is mounted inside the support 44. Only the outlet protruding portion 42 of the sensor body radially protrudes outwards with respect to the support 44. The support 44 is made of metal. In one particular embodiment, the support 44 may be made of steel having a high magnetic permeability.

As shown more clearly on FIG. 2, the sensor unit 30 also comprises a coating 50 deposited on the entire exterior surface of the sensor body 30, sensor element 32, support 44.

The coating 50 is also provided on the exterior surface of the portion of the output cable 34 which protrudes outwards with regard to the sensor body 30. The protruding portion of the output cable 34 is adjacent to the sensor body 30. More precisely, the protruding portion of the output cable 34 is adjacent to the outlet protruding portion 42 of the sensor body. The coating 50 covers the exterior surface of the sheath 38 of this protruding portion of the output cable 34. The entire exterior surface of the sensor body 30, sensor element 32, and support 44 is covered by the coating 50.

Advantageously, the coating 50 is a conformal coating specifically designed for the protection of electronic circuit. For example, the coating 50 may be an FSC or DCA coating available from Electrolube®. Alternatively, other conformal coating may also be used. For example, the thickness of the coating 50 may range from 30 μm to 110 μm. In a variant, it could be possible to foresee another range for the thickness of the coating 50.

Preferably, the coating 50 is applied in a dipping process. Alternatively, the coating 50 may be applied by spraying or brushing.

Figure 4:
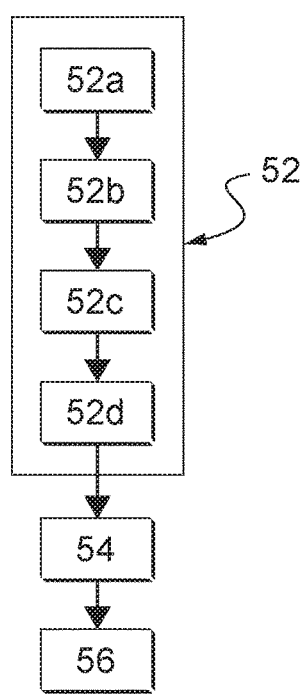
FIG. 4 shows the main steps of a method for coating the sensor bearing unit of FIGS. 1 and 2 according to an example of the invention.

FIG. 4 shows the main steps of a method for coating the sensor unit 10 by dipping according to an example of the invention.

At a first step 52, the coating is performed. More precisely, in a first sub-step 52*a*, one moves downward the sensor unit 10 vertically into a bath of coating, preferably a bath of conformal coating. The coating can be mixed with a dedicated solvent in order to make it thinner if necessary.

During this first sub-step, the sensor unit 10 is oriented vertically in the position as shown in FIG. 1, i.e. with the output cable 34 located above the sensor body 30. The sensor unit 10 is in its assembled state.

The sensor unit 10 is moved vertically into the bath of coating until the sensor element 32, the sensor body 30, the support 44 and the output cable 34 are coated. Preferably, this first sub-step is performed at regular and slow motion in order to ensure that the resulting coating layer recovers perfectly all asperities, with regular thickness and a minimum of air inclusions. For example, the moving speed may be equal to 1 mm/s.

In the illustrated example, only the protruding portion of the output cable 34 which is adjacent to the sensor body 30 is coated. For example, the length of the coating on the output cable may be equal to 5 mm.

In a successive second sub-step 52*b*, one moves upward at a first speed the sensor unit 10 until the sensor element 32 is in the air. For example, the first speed may be equal to 1 mm/s.

In a third sub-step 52*c*, one withdraws completely the sensor unit 10 from the bath at higher speed. This second speed may be less than or equal to 10 mm/s. Alternatively, it could be possible to move upward and withdraw the sensor unit 10 from the bath at the same speed.

Then, in a fourth sub-step 52*c*, the sensor unit 10 is maintained above and outside the bath to drain the residual coating of the sensor unit 10 over the bath. This fourth sub-step may be achieved during approximatively 10 seconds for example.

At a second step 54, the coating is cured at room temperature and at a relative humidity lower or equal to 80%. For example, this first curing step may be performed during 2 hours.

Then, at a third step 56, a second curing step is performed at a higher temperature and at a relative humidity lower or equal to 80%. The second curing step may be performed during several hours, from 2 hours to 24 hours and more if needed. The temperature depends to coating material, and may be equal to 90° C.

After the curing step, the sensor unit 10 may be mounted on the bearing.

At least during the coating step, the sensor unit 10 may be held and suspended by the output cable 34.

As previously mentioned, in the illustrated example, only the protruding portion of the output cable 34 which is adjacent to the sensor body 30 is coated.

In an alternative embodiment, it is possible to apply the coating on a longer length of the output cable 34. For example, if a printed circuit board is provided of the output cable 34, the coating may also be applied on this printed circuit board. Once the coating method is achieved, a dongle may be mounted on the cable around the printed circuit board. Similarly, if the output cable 34 is provided with a printed circuit board connected to the electrical wires and integrated inside the plug connector, the coating may also be applied on the printed circuit board. After coating, the plug connector is mounted on the sheath of the output cable.

In the illustrated example, the sensor unit is secured to the outer ring of the bearing. Alternatively, the sensor unit may be secured to the inner ring.

In the illustrated example, the sensor bearing unit is provided with a rolling bearing comprising one row of rolling elements. Alternatively, the rolling bearing may comprise at least two rows of rolling elements. In the illustrated example, the rolling elements are balls. The rolling bearing may comprise other types of rolling elements, for example rollers. In another variant, the bearing may also be provided with a sliding bearing having no rolling elements.

Figure 5:
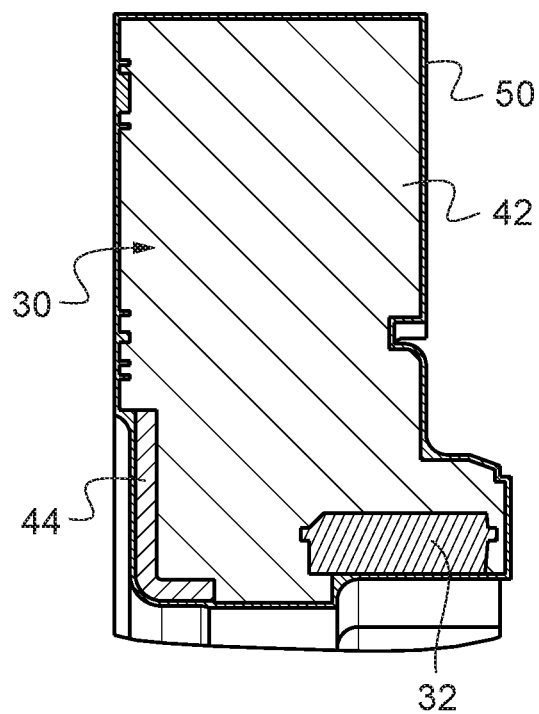
FIG. 5 is a partial section of a sensor unit according to a second example of the invention.

In the illustrated example, the sensor bearing unit is provided with an output cable. Alternatively, as previously mentioned, the sensor bearing unit may be deprived of such output cable as shown on FIG. 5 in which same parts bear same references. In this case, at least during the coating step, the sensor unit may be held and suspended by any other appropriate means.

The invention claimed is:

1. A method for coating a sensor unit comprising:
   providing a sensor element, a sensor body supporting the sensor element, and an output cable,
   applying a first coating by positioning, in an assembled state of the sensor unit, a first layer of a coating on the exterior surface of the sensor unit such as to coat the sensor element, the sensor body, and the output cable, the first layer of the coating having a thickness of between 30 μm and 110 μm,
   after applying the first coating, performing a first curing by curing the first layer of the coating at room temperature for two hours,
   after performing the first curing, applying a second coating by positioning, in the assembled state of the sensor unit, a second layer of the coating on the exterior surface of the sensor unit such as to coat the sensor element, the sensor body, and the output cable, and
   after applying the second coating, performing a second curing of the second layer of the coating at a temperature higher than room temperature for more than twenty-four hours.

2. The method according to claim 1, wherein the step of providing the sensor element further comprises:
   securing the output cable to sensor body through overmolding.

3. The method according to claim 2, wherein the first curing comprises curing the first layer of the coating at a relative humidity lower or equal to 80%.

4. The method according to claim 3, wherein the second curing comprises curing the second layer of the coating at a relative humidity lower or equal to 80%.

5. The method according to claim 2, wherein the first coating and the second coating each comprise the step of the operation of moving the sensor unit vertically downward into a bath of the coating until the sensor element, the sensor body, and the output cable are coated with the coating.

6. The method according to claim 5, wherein the first coating and the second coating each further comprise, after the operation of moving the sensor unit vertically downward, the successive operations of:
   moving the sensor unit upward at a first speed until the sensor element is in the air, and
   withdrawing the sensor unit completely from the bath at second speed, the second speed being greater than the first speed.

7. The method according to claim 2, wherein the first coating and the second coating each comprise the operation of spraying or brushing the coating on the sensor element and the sensor body.

8. The method according to claim 2, wherein the output cable is mounted inside the sensor body and extends outwards, and during the first coating and the second coating, the first layer of the coating and the second layer of the coating only are applied to the output cable outside the sensor body.

9. The method according to claim 8, wherein, during the first coating and the second coating, the coating is also applied on a printed circuit board provided along the output cable or provided into a connector of the output cable.

10. The method according to claim 1, wherein the step of providing the sensor element further comprises:
    securing the output cable to sensor body through gluing.

11. The method according to claim 1, wherein the step of providing the sensor element further comprises:
    securing the output cable to sensor body through press-fitting.

* * * * *